US011159200B2

(12) United States Patent
Huang et al.

(10) Patent No.: US 11,159,200 B2
(45) Date of Patent: Oct. 26, 2021

(54) HIGH SPEED FREQUENCY HOPPING DAS INTERROGATION USING AOM-GATED RE-CIRCULATING LOOP AND FREQUENCY-SHIFTED RECEIVER LO

(71) Applicant: NEC Laboratories America, Inc., Princeton, NJ (US)

(72) Inventors: Yue-Kai Huang, Princeton, NJ (US); Ezra Ip, West Windsor, NJ (US); Giovanni Milione, Franklin Square, NY (US); Fatih Yaman, Princeton, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 16/258,586

(22) Filed: Jan. 26, 2019

(65) Prior Publication Data

US 2019/0238178 A1     Aug. 1, 2019

Related U.S. Application Data

(60) Provisional application No. 62/622,191, filed on Jan. 26, 2018.

(51) Int. Cl.
| | |
|---|---|
| *H04B 1/00* | (2006.01) |
| *H04B 1/7136* | (2011.01) |
| *G01H 9/00* | (2006.01) |
| *H04B 1/715* | (2011.01) |
| *H04B 1/7143* | (2011.01) |
| *H04B 14/00* | (2006.01) |
| *H04B 1/713* | (2011.01) |

(52) U.S. Cl.
CPC ........... *H04B 1/7136* (2013.01); *G01H 9/004* (2013.01); *H04B 1/715* (2013.01); *H04B 1/7143* (2013.01); *H04B 14/00* (2013.01); *H04B 1/713* (2013.01)

(58) Field of Classification Search
CPC ............ G01D 5/35303; G01D 5/35358; G02F 1/335; G02F 1/125; H04B 1/7136; H04B 1/7143; H04B 1/715; G01H 9/004
USPC .......... 375/132, 130, 316, 219, 295; 250/268
See application file for complete search history.

(56) References Cited

U.S. PATENT DOCUMENTS

| | | | |
|---|---|---|---|
| 2004/0170439 A1* | 9/2004 | Hiironen | H04B 14/026 398/190 |
| 2013/0113629 A1 | 5/2013 | Hartog et al. | |
| 2017/0346551 A1 | 11/2017 | Lewis et al. | |
| 2017/0350734 A1* | 12/2017 | Ji | G01D 5/35358 |

\* cited by examiner

*Primary Examiner* — Zewdu A Kassa
(74) *Attorney, Agent, or Firm* — Joseph Kolodka

(57) ABSTRACT

Aspects of the present disclosure describe systems, methods, and structures for high speed frequency hopping distributed acoustic sensing using an acousto-optic modulated (AOM), gated re-circulating loop and a frequency shifted receiver local oscillator. Using the re-circulating loop controlled by the AOM to generate frequency-hopping pulse(s) increases DAS acoustic bandwidth overcomes infirmities exhibited in the art that generate multiple frequency patterns that are not suitable for long-distance DAS. Additionally, by employing frequency shifted local oscillator (LO) with asymmetric in band detection, bandwidth requirements are reduced by one half.

8 Claims, 10 Drawing Sheets

HIGH SPEED FREQUENCY HOPPING DAS INTERROGATION USING AOM-GATED RE-CIRCULATING LOOP AND FREQUENCY-SHIFTED RECEIVER LO

CROSS REFERENCE TO RELATED APPLICATIONS

This application claims the benefit of U.S. Provisional Patent Application Ser. No. 62/622,191 filed 26 Jan. 2018 the entire contents of which is incorporated by reference as if set forth at length herein.

TECHNICAL FIELD

This disclosure relates generally to sensing systems, methods, and structures. More particularly, it pertains to distributed acoustic sensing (DAS) using fiber optic cables to provide distributed strain sensing.

BACKGROUND

Distributed acoustic sensing systems use optical fiber to provide distributed strain sensing. In DAS, the optical fiber serves as a sensing element and measurements are made, and subsequently processed, using attached optoelectronic devices. Such systems allow acoustic frequency strain signals to be detected over large distances and in harsh environments.

Given the utility and importance of DAS systems in a variety of contemporary applications, systems, methods, and structures that enhance their operation would represent a welcome addition to the art.

SUMMARY

An advance in the art is made according to aspects of the present disclosure directed to systems, methods, and structures that provide distributed acoustic sensing over extended distances.

Advantageously—and in sharp contrast to the prior art—systems, methods and structures according to aspects of the present disclosure use a re-circulating optical fiber loop including a gated acousto-optic modulator (AOM) to generate frequency-hopping optical pulses for long-distance DAS systems while achieving high acoustic sensing bandwidth (BW). The number of optical frequencies generated is determined by the number of times an optical pulse re-circulates through the loop, which effectively increases the acoustic sampling rate. Of particular advange, using a frequency hopping pulse source, with pulses equally spaced in time, the maximum sensible acoustic frequency can be increased to N×f where N is the number of frequencies used and the acoustic bandwidth enhancement factor, which can advantageously be controlled by the fiber length employed in the AOM re-circulating loop.

As we shall show and describe, systems, methods, and structures according to aspects of the present disclosure place no limitations on DAS fiber length as the frequency-hopping pulse pattern is not generated through arbitrary waveform generation (AWG), which has memory length capacity restrictions and as we shall describe generally infirm the prior art.

Finally, systems, methods, and structures according to aspects of the present disclosure use an optical frequency shifter to perform "in-band" coherent detection instead of "out-of-band" detection thereby reducing required receiver bandwidth by half. An offset LO frequency within a frequency hopping band advantageously minimizes effects of IQ-imbalance with a coherent receiver and increases system signal-to-noise ratio(s) (SNR).

BRIEF DESCRIPTION OF THE DRAWING

A more complete understanding of the present disclosure may be realized by reference to the accompanying drawing in which.

Figure 1:
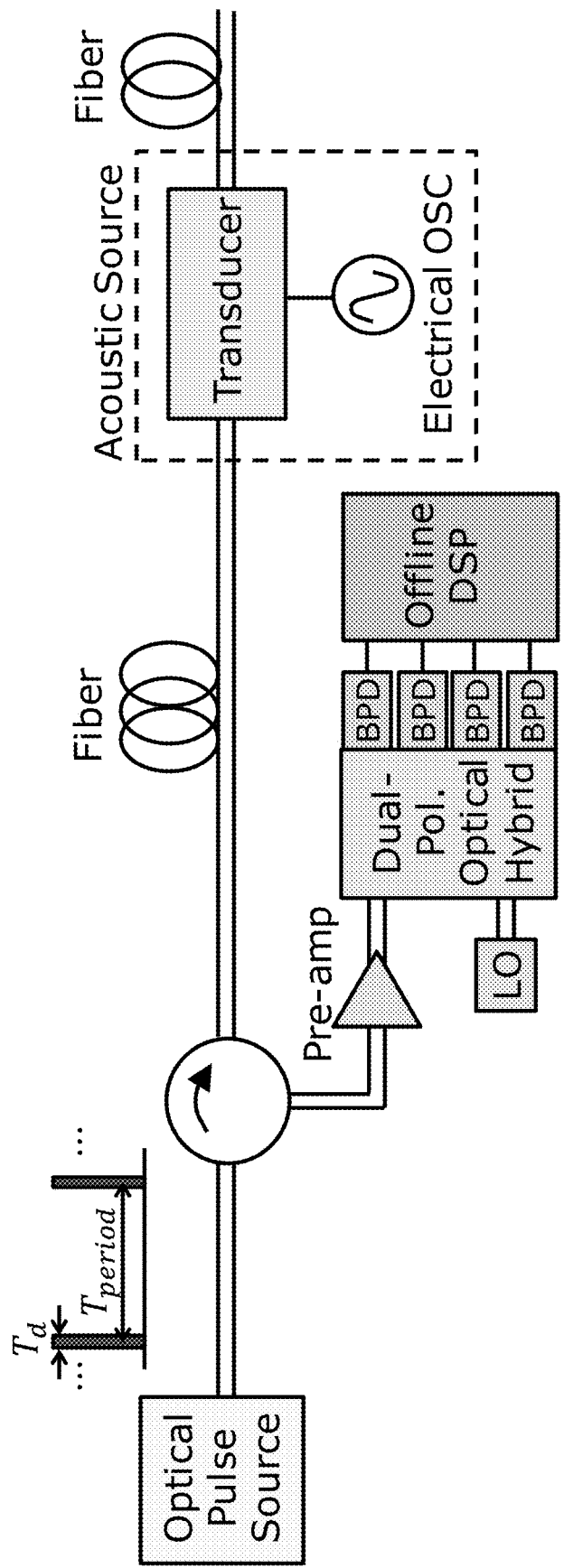
FIG. 1 is a schematic block diagram of an illustrative, prior art differential Rayleigh sensor arrangement.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that with conventional distributed acoustic sensing (DAS) systems, the maximum acoustic frequency is limited to the sensing rate of the interrogator employed. Since DAS systems operate by sending optical pulses into a sensing fiber and use Rayleigh reflection signal for sensing, the sensing rate is directly related to the repetition rate of the optical pulses.

Operationally, in order to achieve distributed sensing and to avoid signal interference, the pulse repetition rate is inversely proportional to the fiber length. Accordingly, the maximum frequency which can be sensed is defined by f=c/4 nL, where c is the speed of light, n is the fiber index, and L is the fiber distance. For interrogators designed to sense long distances—say greater than 100 km—the maximum frequency will be limited to below 500 Hz, which is not enough for some applications such as pipeline health monitoring.

In an article entitled "High sampling rate multi-pulse phase-sensitive OTDR employing frequency division multiplexing" that appeared in Proc. SPIE 9157, 23rd International Conference on Optical Fibre Sensors, 91576X on Jun. 2, 2014, Zhengqing Pan; Zhaoyong Wang; Qing Ye; Haiwen Cai; Ronghui Qu; Zujie Fang; described that by creating optical pulse source with different frequencies, higher acoustic sampling BW can be achieved. By multiplexing four different frequencies, an experimental phase-OTDR system can detect up to 20 kHz vibration detection bandwidth over 10 km sensing range using double side-band modulation.

In an article entitled "High-frequency distributed acoustic sensing faster than repetition limit with frequency-multiplexed phase-OTDR," that was published at the 2016 Optical Fiber Communications Conference and Exhibition (OFC), Anaheim, Calif., 2016, pp. 1-3, D. Iida, K. Toge and T. Manabe disclosed a frequency-encoded phase-OTDR that achieves up to 80-kHz acoustic sensing at 5-km using single side-band modulator.

Finally, Dian Chen, Qingwen Liu, Xinyu Fan, and Zuyuan He, described a "Distributed Fiber-Optic Acoustic Sensor With Enhanced Response Bandwidth and High Signal-to-Noise Ratio," that appeared in J. Lightwave Technol. 35, 2037-2043, 2017, showed that acoustic frequencies up to 9 kHz may be detected over a 24.7-km-long fiber using linear-frequency modulated optical pulses which drives an acoustic-optic modulator (AOM).

Note that all three of these disclosures describe systems/methods using arbitrary waveform generators (AWGs) to create the pulse source with multiple frequencies for the increased acoustic sensing bandwidth. Those skilled in the art will readily appreciate and understand that costs of AWGs however are typically higher than conventional electronics used in the DAS. Additionally, AWG also have limited data memory length thus it poses a continued challenge to generate long frequency mixing sequences for sensing long fiber distances beyond 100 km.

As we shall now show and describe—and in sharp contrast to the prior art—systems, methods, and structures according to the present disclosure employ a re-circulating optical fiber loop including a gated AOM to generate frequency-hopping optical pulses for long-distance DAS systems to advantageously and surprisingly achieve high acoustic sensing bandwidth (BW). Advantageously, the number of optical frequencies is determined by the number of times optical pulse re-circulate through the loop, which effectively increases the acoustic sampling rate. Using a frequency hopping pulse source—with pulses equally spaced in time—the maximum sensible acoustic frequency can be increased to N×f, wherein N is the number of frequencies used and the acoustic bandwidth enhancement factor, which can be controlled by the fiber length employed in the AOM-assisted re-circulating loop.

Advantageously, systems, methods, and structures according to the present disclosure imposes no limitation on the DAS fiber length as the frequency-hopping pulse pattern is not generated through AWG, which has certain memory length cap.

Due to the use of multiple optical frequencies, larger receiver bandwidth is required to parallel process each individual DAS frequency channel. Our invention also utilizes a optical frequency shifter to perform "in-band" coherent detection instead of "out-of-band" detection to reduce the required receiver bandwidth by half. An offset LO frequency within the frequency hopping band will minimize of the effect of IQ-imbalance from coherent receiver and increase system SNR.

Those skilled in the art will understand and appreciate that since single frequency DAS systems exhibit an acoustic bandwidth limitation due to sensing fiber length, the interrogators employed in such systems are necessarily concatenated at appropriate length intervals for long distance sensing in order to achieve the required acoustic bandwidth.

In sharp contrast—by interleaving frequency-hopping pulses created using an AOM loop, systems, methods, and structures according to the present disclosure exhibit an improved, achievable acoustic bandwidth. Advantageously, this provides a lower cost solution—as compared with the prior art, conventional DAS—since fewer interrogators can be used with longer spacing between them, as long as the required signal-to-noise ratio (SNR) can be achieved.

Finally, and as compared to other frequency multiplexing approaches, systems, methods, and structures according to the present disclosure advantageously achieve longer sensing distance because—unlike the prior art—such systems, methods, and structures according to the present disclosure do not create the frequency hopping pattern by using AWG and as such, sensing distance is advantageously not limited by the memory length of the AWG.

Turning now to FIG. 1, there is shown a schematic diagram of a conventional, prior art arrangement of a differential Rayleigh sensor. As is illustrated in that figure, the arrangement includes an optical pulse source and an acoustic source connected by a length of optical fiber. Interposed between the optical pulse source and acoustic source is a circulator that optically connects the fiber to a dual-polarization, coherent receiver/detector.

Operationally, such prior art arrangements operate by the optical pulse source generating optical pulses generally exhibiting a pulse width $T_d$ at a repetition rate of $1/T_{period}$. The pulses are launched into the fiber under test (FUT) through the circulator. Any back-reflected signal(s) due to Rayleigh backscattering is then directed to the dual-polarization coherent receiver.

As those skilled in the art will know and understand, acoustic wave(s) cause the fiber to "stretch"—altering the optical path length and therefore phase between two points z and z+Δz. Differential detection of the back-reflected signal permits measurement of a phase change $\Delta\varphi(z)$ induced by the acoustic wave(s).

Figure 2:
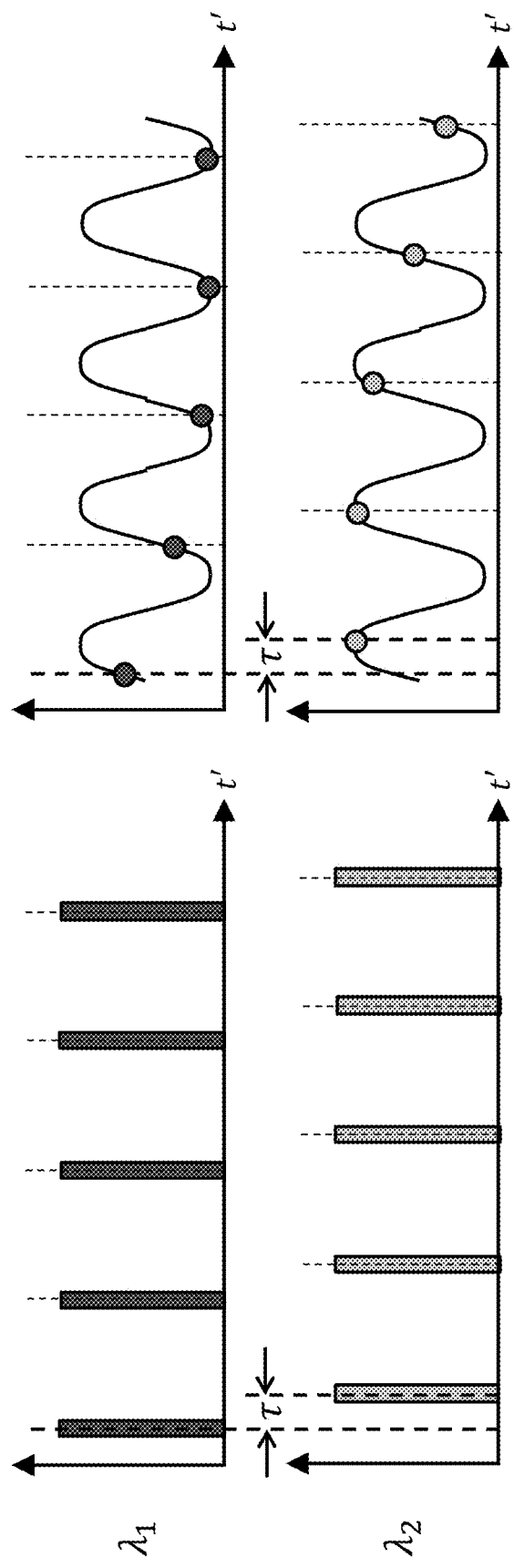
FIG. 2 is a series of plots illustrating increasing acoustic sampling rate using frequency hopping pulses according to aspects of the present disclosure.

With reference now to FIG. 2, there is shown a series of plots illustrating increasing acoustic sampling rate for DAS using frequency hopping pulses according to aspects of the present disclosure.

As noted—in conventional DAS—a maximum sensible acoustic frequency is limited and inversely proportional to the fiber length, thus the optical phase measurement cannot be faster than repetition rate $T_{period}$ of the pulses. Accordingly, the highest acoustic frequency that can be measured is $f_{max}=\frac{1}{2}T_{period}$.

According to aspects of the present disclosure, temporal resolution, or acoustic sensing bandwidth, can be improved by $N_p$ times by using a pulse train's stagger—equally spaced in time. The pulse train's optical frequencies will hop from pulse to pulse, so the acoustic phase measurement at each optical frequency can be extracted by filtering and interleaving together to assemble the complete acoustic waveforms.

Figure 3:
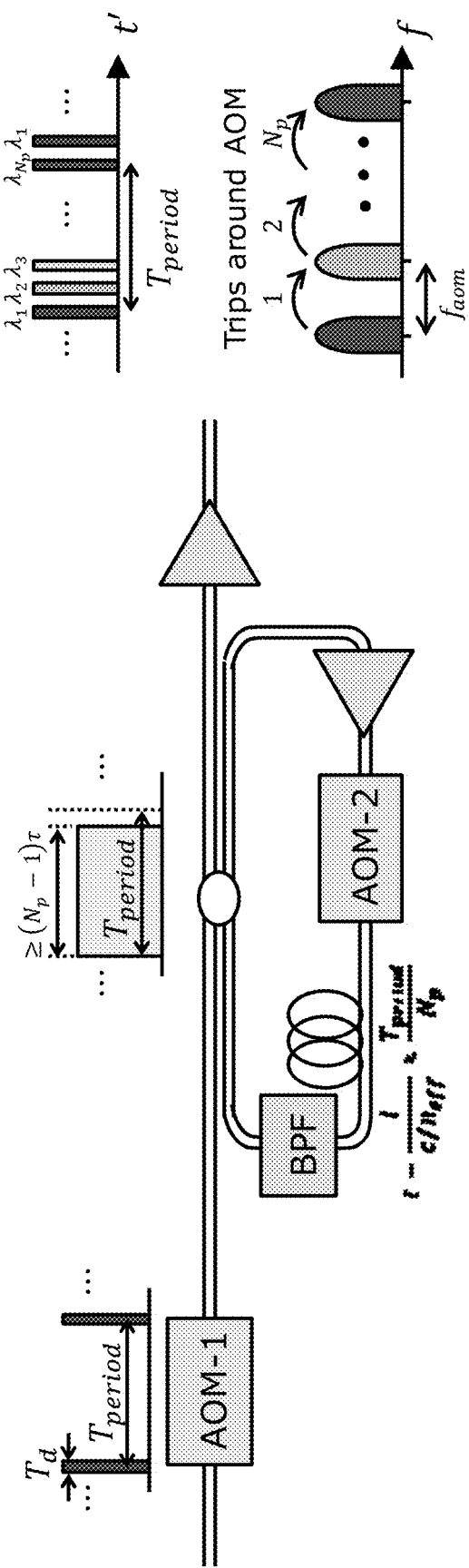
FIG. 3 is a schematic diagram of an illustrative configuration of a DAS employing frequency hopping pulse generation using an acoustic optical modulator (AOM) re-circulating loop according to aspects of the present disclosure.

Turning now to FIG. 3, there is shown a schematic diagram of an illustrative arrangement for frequency hopping pulse generation using an AOM re-circulating loop according to aspects of the present disclosure. As shown in that figure, a section of optical fiber includes an acousto-optic-modulator (AOM-1) and a fiber amplifier (i.e., erbium-doped fiber amplifier—EDFA). Interposed between the amplifier and the AOM-1, is a recirculating loop including a section of fiber, a second AOM, AOM2, an optical amplifier and a bandpass filter.

Operationally, a continuous wave laser signal is first sent to AOM-1, which carves pulses at a repetition interval of $T_{period}$—like a conventional, prior-art DAS. In contrast to the prior art however, the single frequency pulse is then directed to a re-circulating loop where AOM-2 is used to switch open and close the loop.

To operate the AOM switch, a radio frequency (RF) signal at frequency $f_{AOM}$ is used to drive an electrical port of the AOM, thus each pass through AOM-2 will produce a frequency shift of $f_{AOM}$ on the optical pulse. The fiber included in the loop is used to stagger the frequency hopping pulse interval with a propagation delay of $T_{period}/N_p$. Thus, after optical coupling at the output of the re-circulating loop, $N_p$ pulse will be created with frequency spacing determined by the RF drive frequency $f_{AOM}$, which is tunable within the operation spec of the AOM (typically between 50~100 MHz). The EDFA gain inside the loop can be controlled to ensure all $N_p$ pulses have equalized power levels and the optical band pass filter (BPF) reject out-of-band amplified spontaneous emission (ASE) noise at each pass to prevent noise accumulation.

Figure 4:
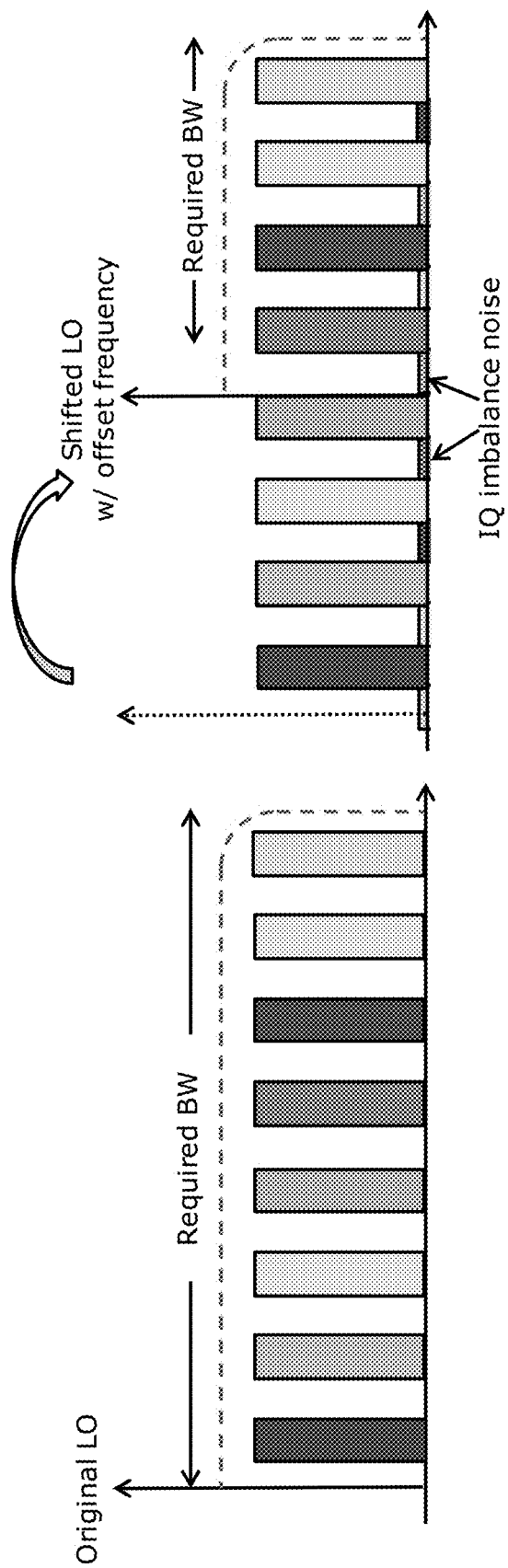
FIG. 4 are plots illustrating coherent receiver design for frequency hopping DAS with shifted local oscillator (LO) with offset frequency according to aspects of the present disclosure.

Since optical frequency multiplexing is applied in the frequency hopping DAS system, a coherent receiver will need larger bandwidth to receive all the signal frequencies for parallel signal processing. According to aspects of the present disclosure, we disclose a special receiver design where the received LO is shifted to the inside of the signal frequency band to perform "in-band" detection and reduce the bandwidth requirement, as shown graphically in FIG. 4.

In this scheme, both in-phase and quadrature portion of the LO-signal beat signals are captured so both the positive and negative frequencies will contain signal information after down-conversion. However, an IQ imbalance may arise due to different response of in-phase and quadrature lanes. To deal with such IQ imbalance, the LO shift frequency is designed and configured to have an offset for an asymmetric received spectrum. This way, the IQ imbalance image of each signal frequency will not overlap with the other frequencies to cause signal interference.

Figure 5:
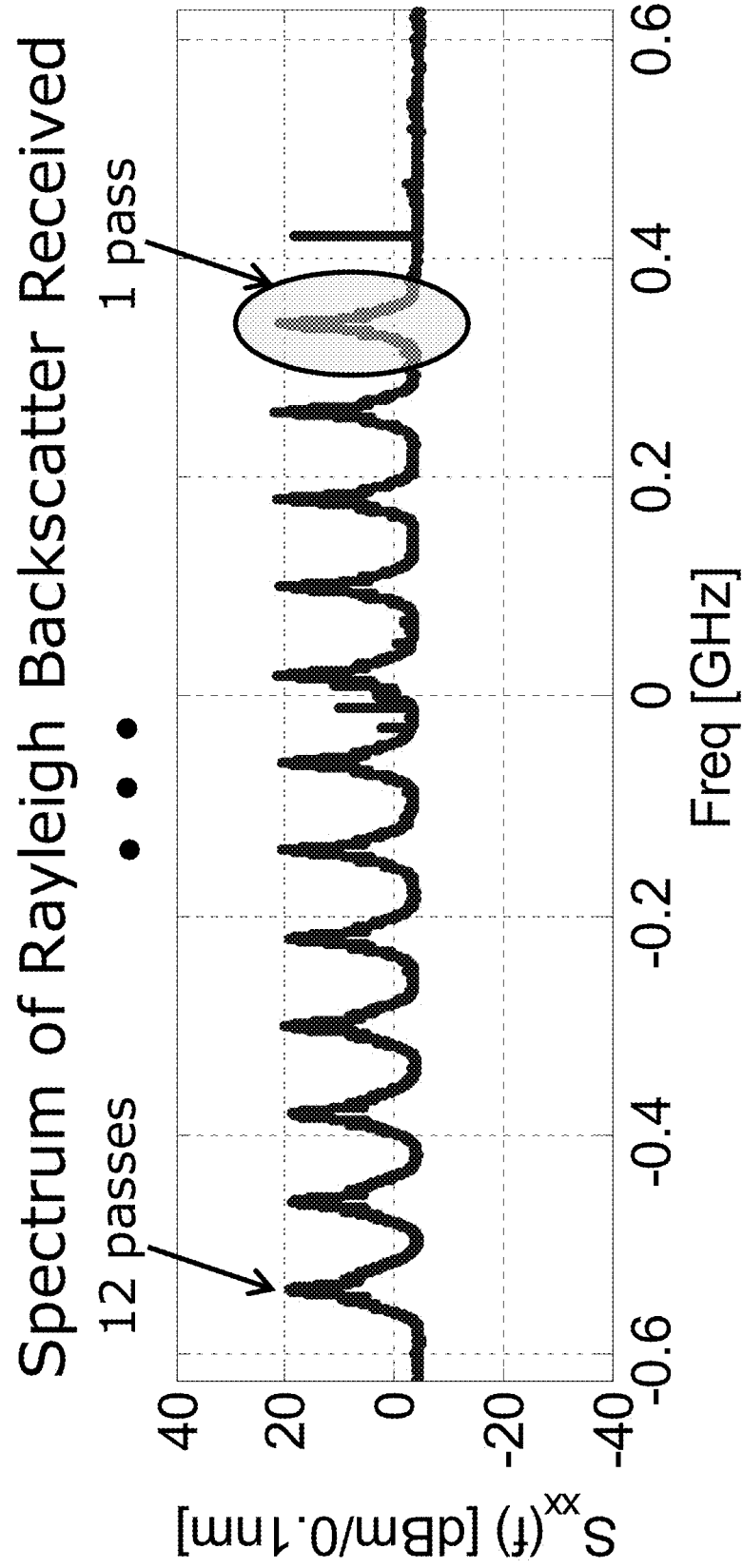
FIG. 5 is a plot illustrating a received spectrum of Rayleigh backscatter signal using frequency hopping pulses according to aspects of the present disclosure.

An experimentally captured signal spectrum is plotted in FIG. 5. In this experiment, a total of 12 frequencies were used per period to achieve an acoustic frequency enhancement $N_p=12$. Each optical pulse has 200-ns pulse width to achieve 20.7 m spatial resolution. The initial pulse repetition rate was at 625-Hz and provides a $T_{period}=1.6$ ms, which corresponds to a maximum sensing distance at 166 km. The AOM loop round trip length was set at 27.9 km to create time delay of 134.29 μs between consecutive pulses. The frequency separation is determined by $f_{AOM}=80$ MHz. The received signal is mixed with an LO laser whose frequency is shifted by 420 MHz (offset by 20-MHz) so all 12 tones are within Nyquist sampling rate of 1.25 Gsps In FIG. 6(A), FIG. 6(B), and FIG. 7(A), and FIG. 7(B), we show several typical recorded differential optical phase traces during test(s) measured using a frequency-hopping DAS testbed. The test(s) were conducted over a 150-km long sensing fiber with a fiber stretcher attached at the end to emulate acoustic vibration.

Figure 6A:
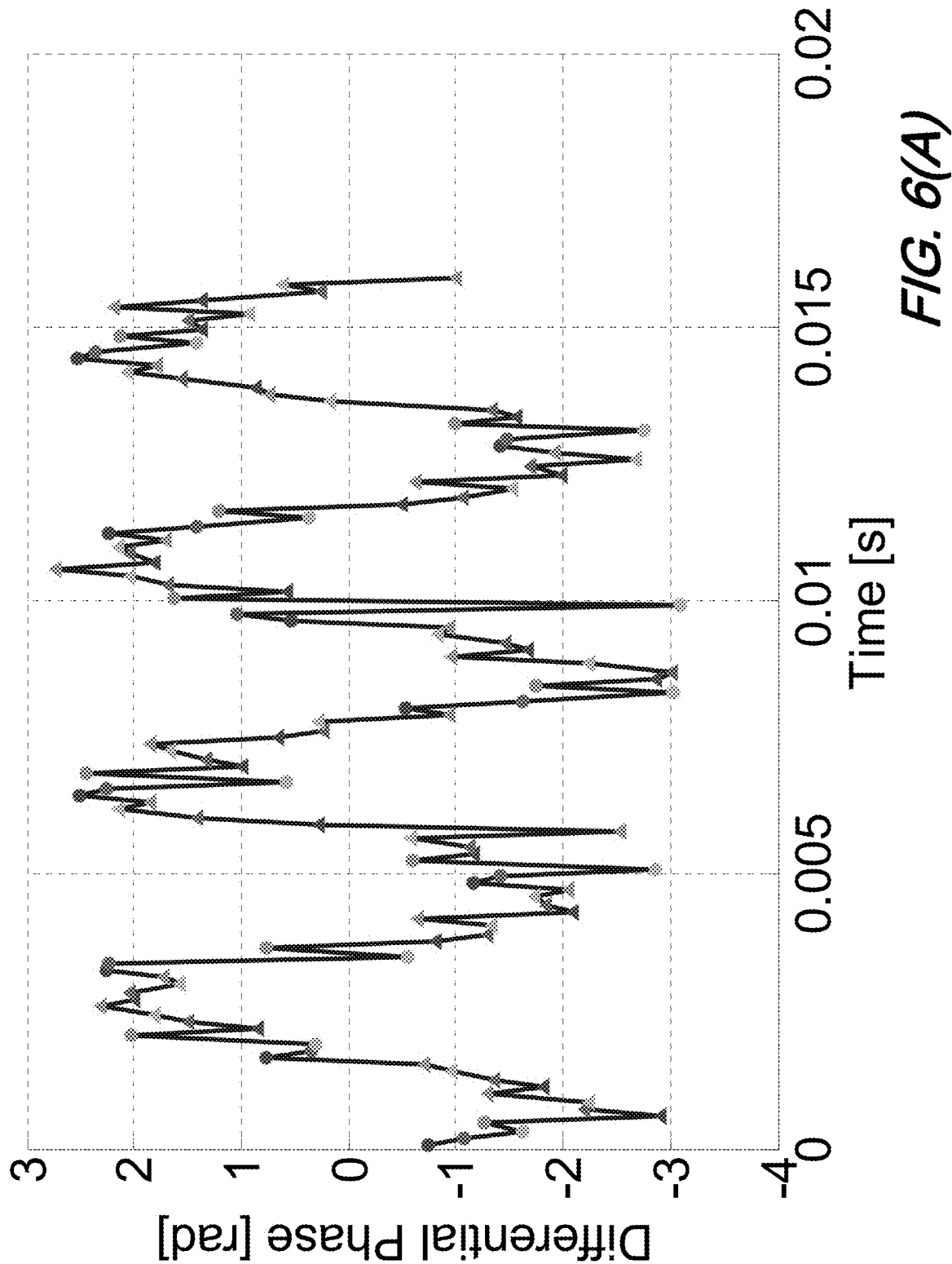
FIG. 6(A) and FIG. 6(B) are plots illustrating differential phase traces for a 150-km DAS with 250-Hz acoustic frequencies according to aspects of the present disclosure.
Figure 6B:
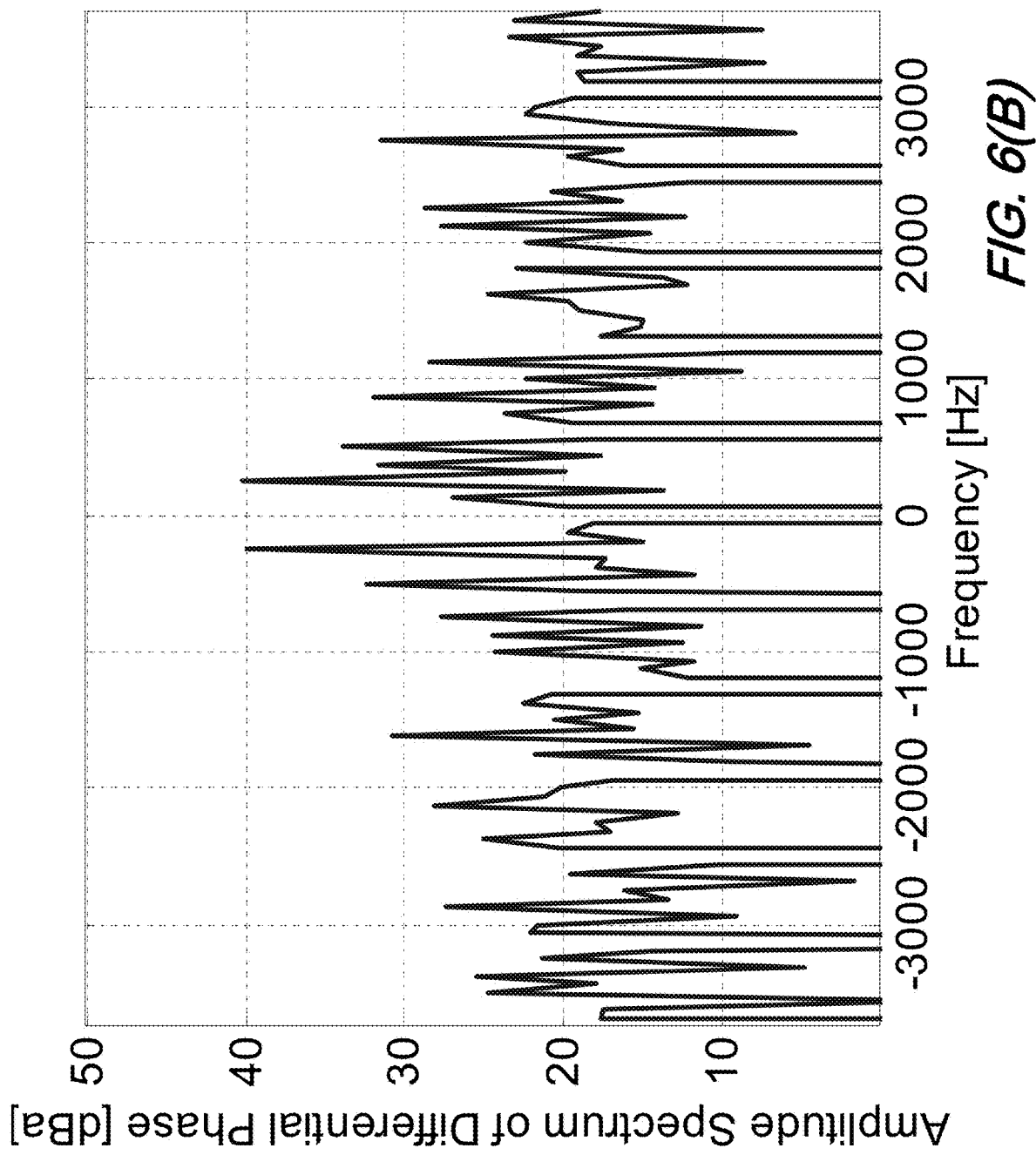
Figure 6C:
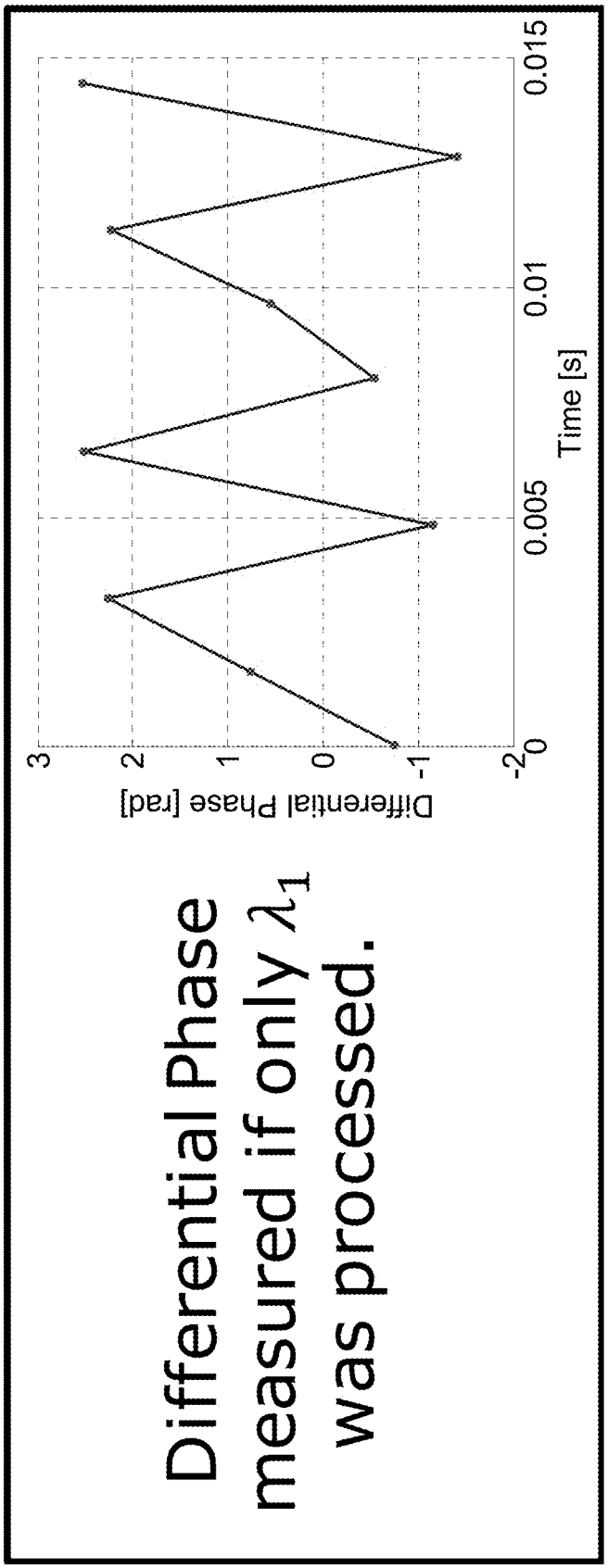
FIG. 6(C) is a plot illustrating differential phase measured if only $\lambda_1$ is processed according to aspects of the present disclosure.

In FIG. 6(A) and FIG. 6(B) the waveform showing the applied acoustic frequency at 250 Hz is stitched together by using all 12 optical frequencies. FIG. 6(C) graphically shows a differential phase measured if only $\lambda_1$ is processed.

Figure 7A:
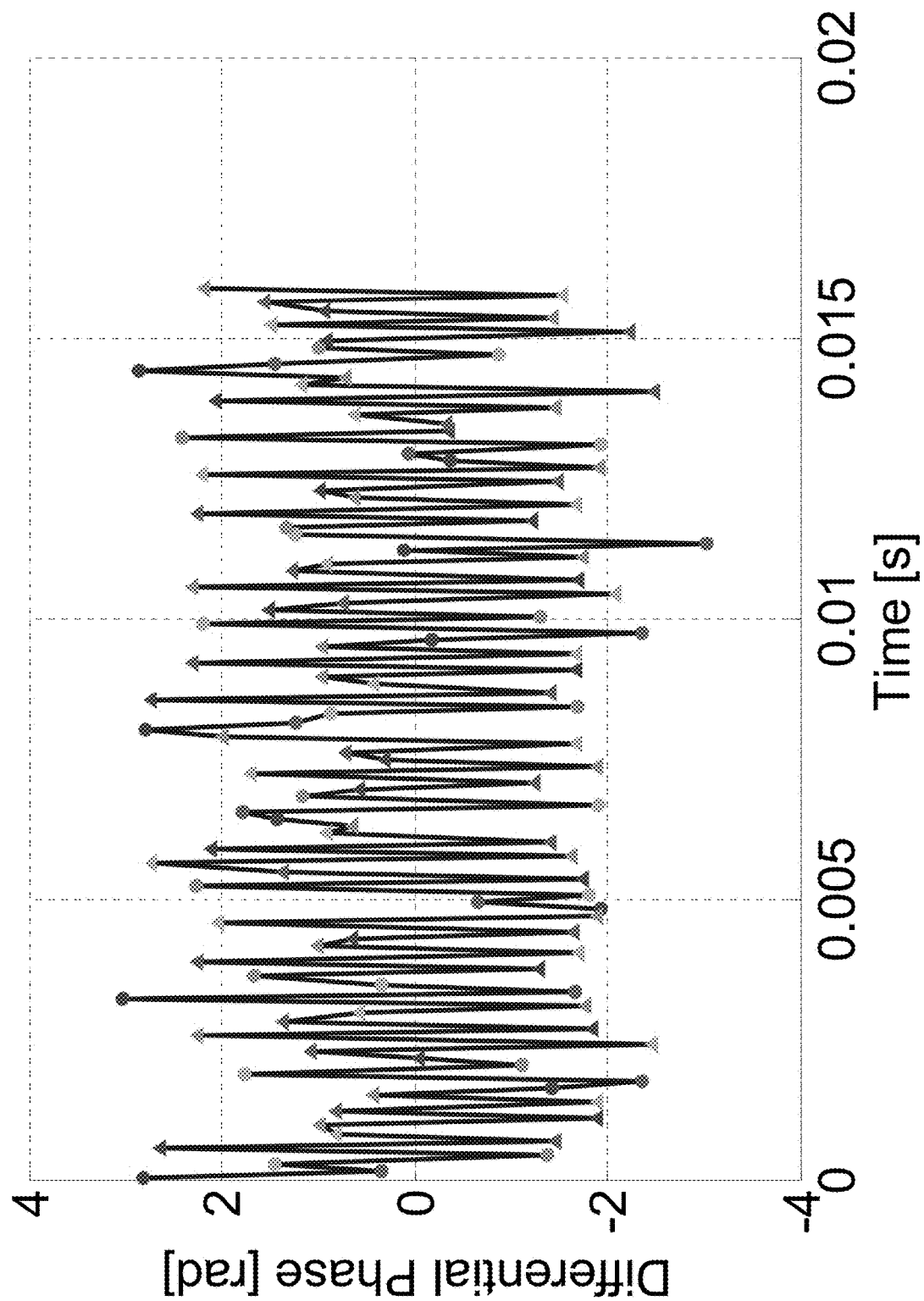
FIG. 7(A) and FIG. 7(B) are plots illustrating differential phase traces for a 150-km DAS with 3-kHz acoustic frequencies according to aspects of the present disclosure.
Figure 7B:
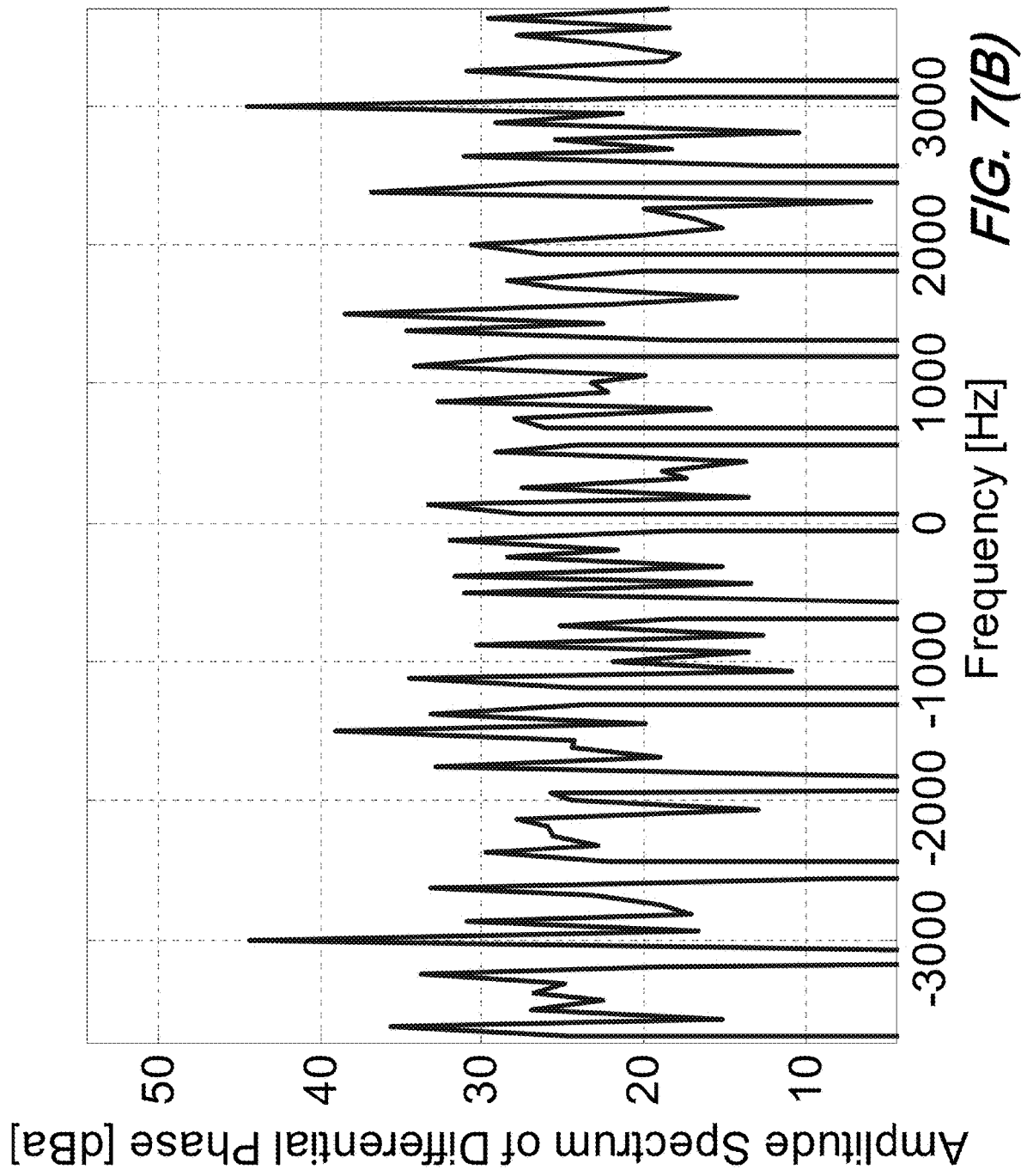

In FIG. 7(A) and FIG. 7(B), we show that when 3-kHz acoustic signal is applied to the stretcher, the acoustic waveform can still be obtained using the system. Those skilled in the art will appreciate that such a measurement would have been impossible with a single frequency DAS system having an original repetition rate of 625 Hz.

At this point, while we have presented this disclosure using some specific examples, those skilled in the art will recognize that our teachings are not so limited. Accordingly, this disclosure should be only limited by the scope of the claims attached hereto.

The invention claimed is:

1. An improved fiber optical distributed acoustic sensing (DAS) assembly, the system comprising an optical fiber, a light transmission and receiving assembly in optical communication with the optical fiber, the DAS assembly CHARACTERIZED BY:
   a re-circulating optical fiber loop including a gated acousto-optic modulator (AOM), said re-circulating optical fiber loop connected to the optical fiber;
   the re-circulating optical fiber loop is configured to generate frequency-hopping optical pulses; and
   the circulating optical fiber loop is configured to generate a number of optical frequencies, said number determined by the number of times an optical pulse re-circulates through the loop.

2. The DAS system of claim 1 FURTER CHARCTERIZED BY: the frequency-hopping optical pulses increase an effective acoustic sampling rate of the DAS.

3. The DAS system of claim 2 FURTHER CHARACTERIZED BY: a seed optical pulse exhibiting a single frequency generates multiple trailing pulses at different frequencies.

4. The DAS system of claim 1 FURTHER CHARACTERIZED BY: a radio frequency (RF) frequency of an electrical drive signal applied to the AOM sets a frequency spacing in each of the frequency-hops.

5. The DAS system of claim 4 FURTHER CHARACTERIZED BY: the re-circulating loop includes an optical fiber delay length configured to set adjacent pulse staggering time(s).

6. The DAS system of claim 5 FURTHER CHARACTERIZED BY: the re-circulating loop includes an erbium-doped fiber amplifier (EDFA) configured to equalize poser of the frequency hopping pulses.

7. The DAS system of claim 6 FURTHER CHARACTERIZED BY: a frequency shifted local oscillator (LO) for coherently detecting DAS signal such that receiver bandwidth is reduced.

8. The DAS system of claim 7 FURTHER CHARACTERIZED BY: the LO frequency offset is configured such that any interference from I/Q imbalance is eliminated.

\* \* \* \* \*